United States Patent
Kazami

(10) Patent No.: US 10,134,319 B2
(45) Date of Patent: Nov. 20, 2018

(54) ILLUMINATION DISPLAY DEVICE WITH ILLUMINATION REGION CONTROL, ELECTRONIC APPARATUS AND CONTROL METHOD THEREFOR

(75) Inventor: Satoru Kazami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/420,785

(22) PCT Filed: Aug. 24, 2012

(86) PCT No.: PCT/JP2012/005316
§ 371 (c)(1),
(2), (4) Date: Feb. 10, 2015

(87) PCT Pub. No.: WO2014/030191
PCT Pub. Date: Feb. 27, 2014

(65) Prior Publication Data
US 2015/0206469 A1    Jul. 23, 2015

(51) Int. Cl.
*G06F 3/041* (2006.01)
*G06F 3/048* (2013.01)
(Continued)

(52) U.S. Cl.
CPC ......... *G09G 3/2003* (2013.01); *G06F 1/3215* (2013.01); *G06F 1/3265* (2013.01);
(Continued)

(58) Field of Classification Search
CPC .............................. G09G 3/342; G06F 3/0416
See application file for complete search history.

(56) References Cited

U.S. PATENT DOCUMENTS

| | | | |
|---|---|---|---|
| 6,590,568 B1 * | 7/2003 | Astala | G06F 3/0486 178/18.01 |
| 2008/0238880 A1 * | 10/2008 | Miwa | G06F 3/0416 345/173 |

(Continued)

FOREIGN PATENT DOCUMENTS

| | | |
|---|---|---|
| JP | H09-62198 A | 3/1997 |
| JP | H11-119913 A | 4/1999 |

(Continued)

OTHER PUBLICATIONS

PCT: WO 2007/072315 , Lashina.*

(Continued)

*Primary Examiner* — Devona Faulk
*Assistant Examiner* — Ming Wu

(57) ABSTRACT

Provided is a display device capable of illuminating a region desired by a user with a simple operation. A display device according to one exemplary embodiment of the invention includes a display means, a touch panel that is disposed on the display means and outputs coordinate information of a contact point, and a control means that sets a region around a contact point as an illumination region when contact with the touch panel is made at one point and sets a region interposed between a first contact point and a second contact point as the illumination region when contact with the touch panel is made at two points based on the coordinate information of the contact point.

3 Claims, 11 Drawing Sheets

(51) Int. Cl.
    *G09G 3/20*         (2006.01)
    *G06F 1/32*         (2006.01)
    *G09G 3/34*         (2006.01)
    *G06F 3/0488*      (2013.01)

(52) U.S. Cl.
    CPC ............ *G06F 3/041* (2013.01); *G06F 3/0416* (2013.01); *G06F 3/0488* (2013.01); *G09G 3/3406* (2013.01); *G06F 2203/04104* (2013.01); *G09G 2320/0606* (2013.01); *G09G 2320/0666* (2013.01); *G09G 2354/00* (2013.01); *Y02D 10/153* (2018.01)

(56) References Cited

U.S. PATENT DOCUMENTS

| | | | |
|---|---|---|---|
| 2010/0110017 A1* | 5/2010 | Lee | G06F 3/04886 345/173 |
| 2011/0063276 A1* | 3/2011 | Tan | G09G 3/342 345/212 |
| 2011/0261087 A1 | 10/2011 | Bahk | |
| 2012/0013552 A1 | 1/2012 | Ahn | |

FOREIGN PATENT DOCUMENTS

| | | | |
|---|---|---|---|
| JP | H11-184434 A | 7/1999 | |
| JP | 2005-309987 A | 11/2005 | |
| JP | 2007-504509 A | 3/2007 | |
| JP | 2008-224344 A | 9/2008 | |
| JP | 2009-015573 A | 1/2009 | |
| JP | 2009-104268 A | 5/2009 | |
| JP | 2010-130159 A | 6/2010 | |
| JP | 2010-251919 A | 11/2010 | |
| JP | 2011-216066 A | 10/2011 | |
| JP | 2012-181412 A | 9/2012 | |
| WO | WO 2007072315 A1 * | 6/2007 | ........... G06F 3/0481 |
| WO | 2010/041826 A2 | 4/2010 | |

OTHER PUBLICATIONS

Greg Chapman, Oct. 10, 2010, KompoZer and The GIMP for Beginners.*

International Search Report for PCT Application No. PCT/JP2012/005316, dated Nov. 27, 2012.

Extended European Search Report for EP Application No. EP12883360.5 dated Dec. 23, 2015.

* cited by examiner

ILLUMINATION DISPLAY DEVICE WITH ILLUMINATION REGION CONTROL, ELECTRONIC APPARATUS AND CONTROL METHOD THEREFOR

This application is a National Stage Entry of PCT/JP2012/005316 filed on Aug. 24, 2012, the contents of all of which are incorporated herein by reference, in their entirety.

TECHNICAL FIELD

The present invention relates to a display device, an electronic apparatus, and an illumination region control method of a display device.

BACKGROUND ART

Electronic apparatus such as a mobile phone, PHS (Personal Handyphone System) and PDA (Personal Data Assistance) having a touch panel on a display unit and works when a user touches a desired position of the touch panel are widely used today.

Such electronic apparatus increasingly have a large-sized screen. A display unit in an electronic apparatus consumes a large amount of power among devices in the electronic apparatus, and the trend toward a large-sized screen results in a further increase in power consumption.

The mobile phone disclosed in Patent Literature 1 has a structure in which the border between a region to be illuminated and a region to be not illuminated is determined when a user continuously touches a touch panel, moving a finger along the border.

Further, the mobile phone disclosed in Patent Literature 2 has a structure in which an operation key to control on and off of illumination of first and second display regions is pressed through a touch panel.

CITATION LIST

Patent Literature

PTL1: Japanese Unexamined Patent Application Publication No. 2010-130159
PTL2: Japanese Unexamined Patent Application Publication No. H9-62198

SUMMARY OF INVENTION

Technical Problem

The mobile phone disclosed in Patent Literature 1 has a problem that the border cannot be determined unless a user continuously touches a desired border part on the touch panel with a finger or the like, which requires a complicated operation.

The mobile phone disclosed in Patent Literature 2 has a problem that a region desired by a user cannot be illuminated.

An exemplary object of the present invention is to provide a display device, an electronic apparatus, and an illumination region control method of a display device that solve the above-described problems.

Solution to Problem

A display device according to one exemplary aspect of the present invention includes a display unit, a touch panel that is disposed on the display means and outputs coordinate information of a contact point, and a control unit that sets a region around a contact point as an illumination region when contact with the touch panel is made at one point, and sets a region interposed between a first contact point and a second contact point as the illumination region when contact with the touch panel is made at two points, based on the coordinate information of the contact point.

An electronic apparatus according to one exemplary aspect of the present invention includes the above-described display device.

A control method of a display device according to one exemplary aspect of the present invention includes determining whether coordinate information of a second contact point is input within a specified period of time after coordinate information of a first contact point is input by contact with a touch panel disposed on a display means, and when the coordinate information of the second contact point is input within the specified period of time, setting a region interposed between the first contact point and the second contact point as an illumination region, and when the coordinate information of the second contact point is not input within the specified period of time, setting a region around the first contact point as the illumination region.

Advantageous Effects of Invention

According to the exemplary aspect of the present invention, it is possible to provide a display device, an electronic apparatus, and an illumination region control method of a display device that can illuminate a region desired by a user with a simple operation.

DESCRIPTION OF EMBODIMENTS

A display device, an electronic apparatus, and an illumination region control method of a display device according to exemplary embodiments of the invention will be described hereinbelow. The present invention, however, is not limited to the below-descried exemplary embodiments. The following description and the attached drawings are appropriately shortened and simplified to clarify the explanation.

First Exemplary Embodiment

Figure 1:
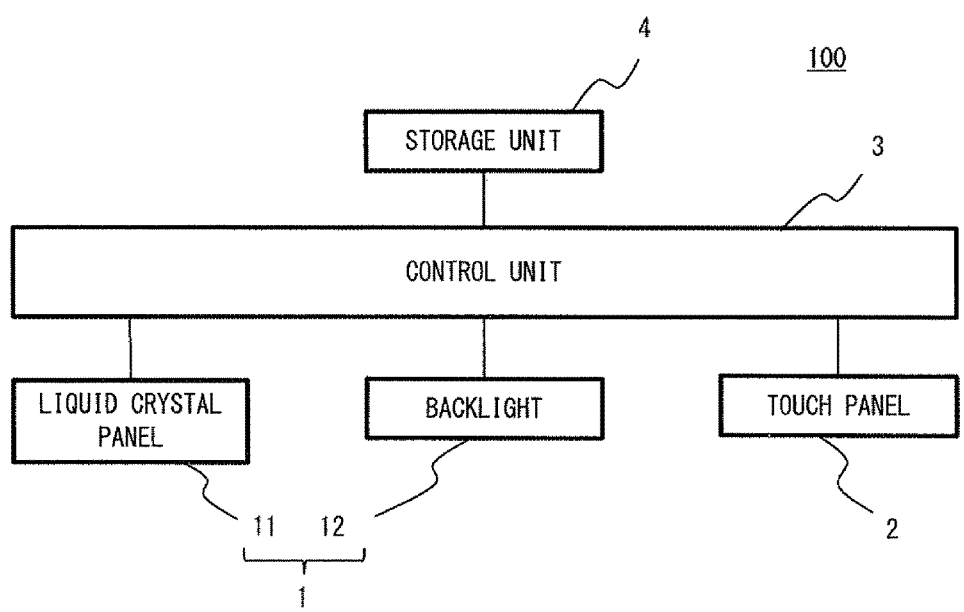
FIG. 1 is a block diagram schematically showing a display device according to a first exemplary embodiment of the invention.

First, the minimum structure of a display device according to this exemplary embodiment is described hereinafter. The display device is a device of an electronic apparatus and is housed in a housing, which is not shown. A display device 100 shown in FIG. 1 includes a display unit 1, a touch panel 2, a control unit 3, and a storage unit 4. The control unit 3 and the storage unit 4 according to this exemplary embodiment implement not only the functions of the display device 100 but also the functions of the electronic apparatus. Note that, however, the control unit 3 and the storage unit 4 may implement the functions of the display device 100 only.

Figure 2:
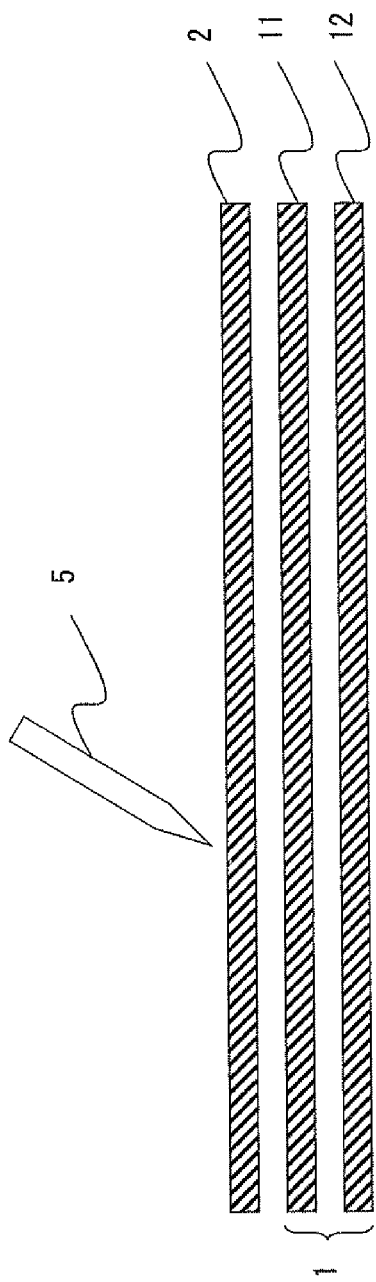
FIG. 2 is a view schematically showing the layout of a display unit and a touch panel in the display device according to the first exemplary embodiment of the invention.

The display unit 1 is a display device that is capable of partial display and displays information or the like that is stored in the storage unit 4. Specifically, as shown in FIG. 2, the display unit 1 includes a liquid crystal panel 11 and a backlight 12 that is placed below the liquid crystal panel 11, for example, and the backlight 12 can be partially illuminated. Note that, however, the display unit 1 may be made using an inorganic EL (Electro-Luminescence) display device, an organic EL display device or the like. The display unit 1 is exposed in an opening of the housing, covered with the touch panel 2.

The touch panel 2 is disposed on the display plane of the display unit 1 as shown in FIG. 2. A common touch panel can be used as the touch panel 2, and a touch panel such as a matrix switch, resistance film, surface acoustic wave or capacitance touch panel may be used, for example. When a user comes into contact with a desired position on the touch panel 2 using a touch pen 5, a finger or the like, the touch panel 2 outputs coordinate information of the point of contact to the control unit 3.

The control unit 3 implements the functions of a mobile phone, for example, based on a program stored in the storage unit 4 and also controls the liquid crystal panel 11 and the backlight 12 to display information nor the like stored in the storage unit 4.

When a user selects a partial illumination mode that is displayed on the display unit 1 through the touch panel 2 in the state where the display unit 1 is fully illuminated, for example, the control unit 3 controls the illumination operation of the backlight 12 based on the coordinate information that is input from the touch panel 2 after that.

To be more specific, when contact with the touch panel 2 is made at one point after a user selects the partial illumination mode, the control unit 3 controls the backlight 12 so that a region around the contact point A is the illumination region R, and the other region is the no-illumination region S as shown in FIGS. 3 to 6.

Figure 3:
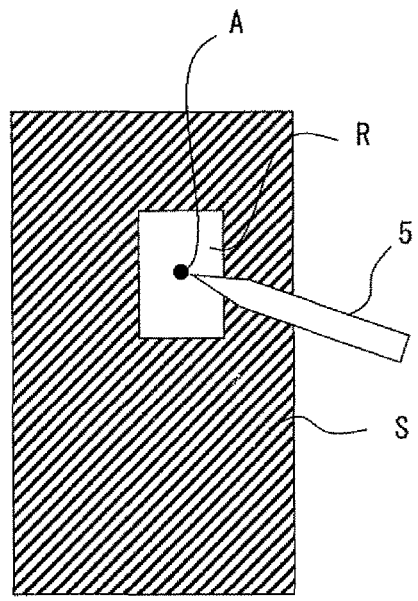
FIG. 3 is a view showing a rectangle-shaped illumination region when there is one point of contact.
Figure 4:
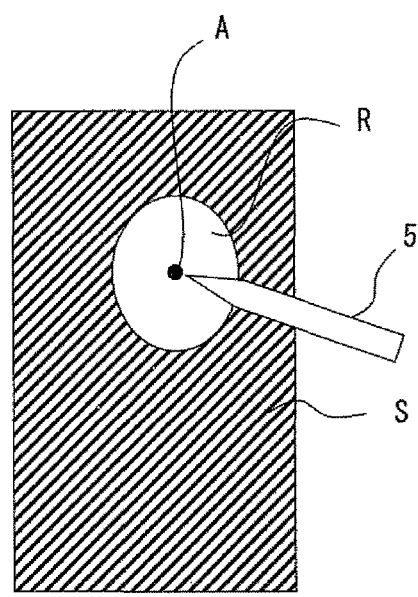
FIG. 4 is a view showing an oval-shaped illumination region when there is one point of contact.

For example, in the example of FIG. 3, a rectangle-shaped region that has the contact point A at its center of gravity (at the intersection of the two diagonal lines) is the illumination region R. In the example of FIG. 4, an oval-shaped region that has the contact point A at its center of gravity (at the intersection of the long and short axes) is the illumination region R. The illumination region R is set appropriately according to the type of information or the like that is displayed on the display unit 1.

Figure 5:
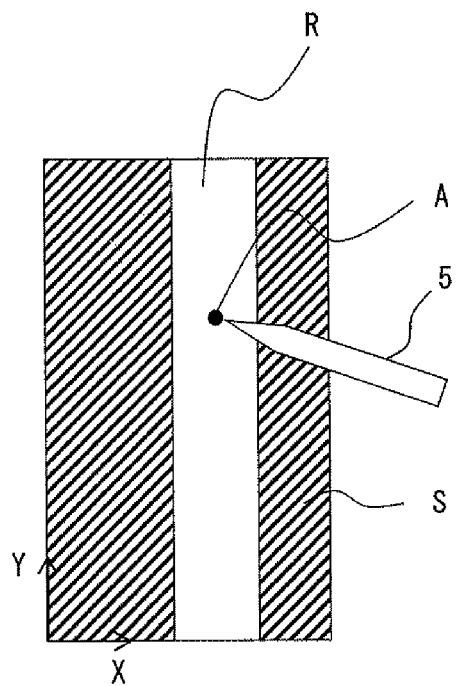
FIG. 5 is a view showing a strip-shaped illumination region when there is one point of contact.

In the example of FIG. 5, a strip-shaped region that lies vertically in the display unit 1 and has the contact point A within its region is the illumination region R. For example, in the example of FIG. 5, a line that extends in parallel with the y-axis from the coordinate position where a specified value is added or subtracted from the coordinate position of the contact point A on the x-axis is the border between the illumination region R and the no-illumination region S.

Figure 6:
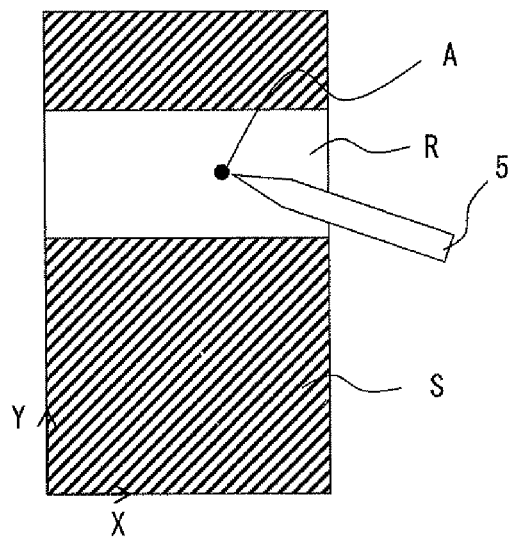
FIG. 6 is a view showing another strip-shaped illumination region when there is one point of contact.

In the example of FIG. 6, a strip-shaped region that lies horizontally in the display unit 1 and has the contact point A within its region is the illumination region R. For example, in the example of FIG. 6, a line that extends in parallel with the x-axis from the coordinate position where a specified value is added or subtracted from the coordinate position of the contact point A on the y-axis is the border between the illumination region R and the no-illumination region S.

Note that the specified value is set appropriately according to the type of information or the like that is displayed on the display unit 1. Further, a line that extends in parallel with the y-axis or the x-axis from the coordinate position of the contact point A on the x-axis or the y-axis and a line that extends in parallel with the y-axis or the x-axis from the position where a specified value is added or subtracted from the coordinate position of the contact point A on the x-axis or the y-axis may be the border between the illumination region R and the no-illumination region S. In other words, the region may be any shape as long as it can be derived from the contact point A.

On the other hand, when contact with the touch panel 2 is made at two points after a user selects the partial illumination mode, the control unit 3 controls the backlight 12 so that a region interposed between the contact points A and B is the illumination region R, and the other region is the no-illumination region S as shown in FIGS. 7 to 10.

Figure 7:
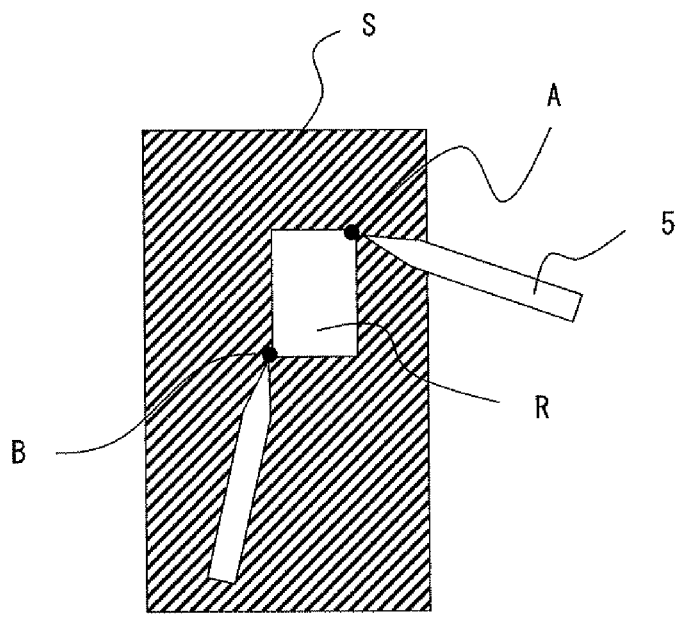
FIG. 7 is a view showing a rectangle-shaped illumination region when there are two points of contact.
Figure 8:
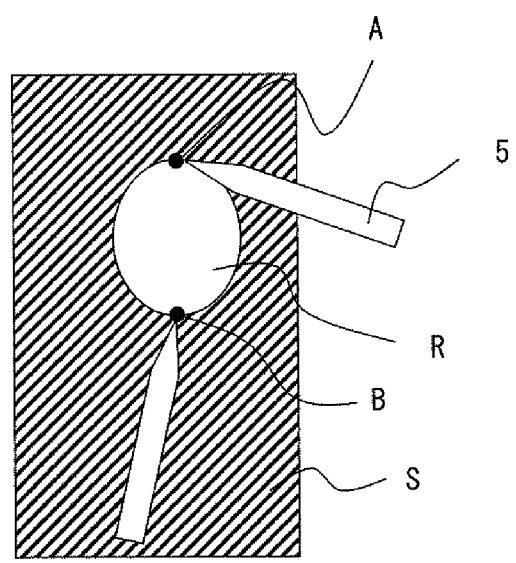
FIG. 8 is a view showing an oval-shaped illumination region when there are two points of contact.

For example, in the example of FIG. 7, a rectangle-shaped region that has the contact points A and B at its opposing corners is the illumination region R. In the example of FIG. 8, an oval-shaped region that has the contact points A and B at the both ends of its long axis is the illumination region R.

Figure 9:
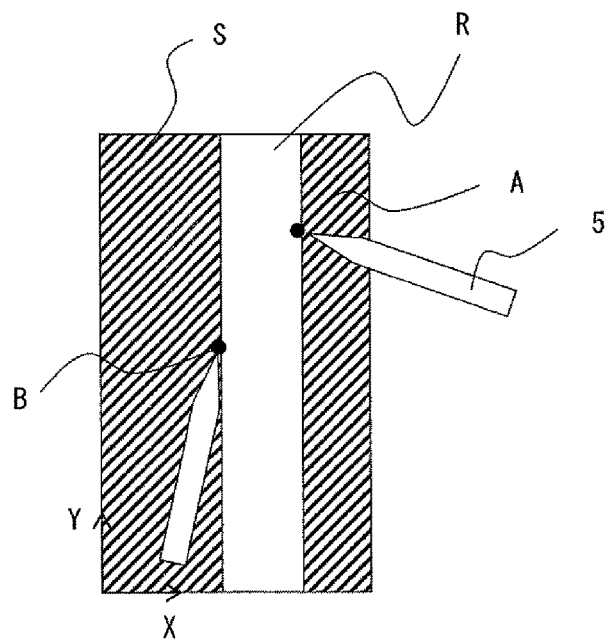
FIG. 9 is a view showing a strip-shaped illumination region when there are two points of contact.

In the example of FIG. 9, a strip-shaped region that lies vertically in the display unit 1 and has the contact points A and B on its left and right vertical sides (the sides that extend in parallel with the y-axis) is the illumination region R. Specifically, lines that extend in parallel with the y-axis from the coordinate positions of the contact points A and B on the x-axis are the borders between the illumination region R and the no-illumination region S.

Figure 10:
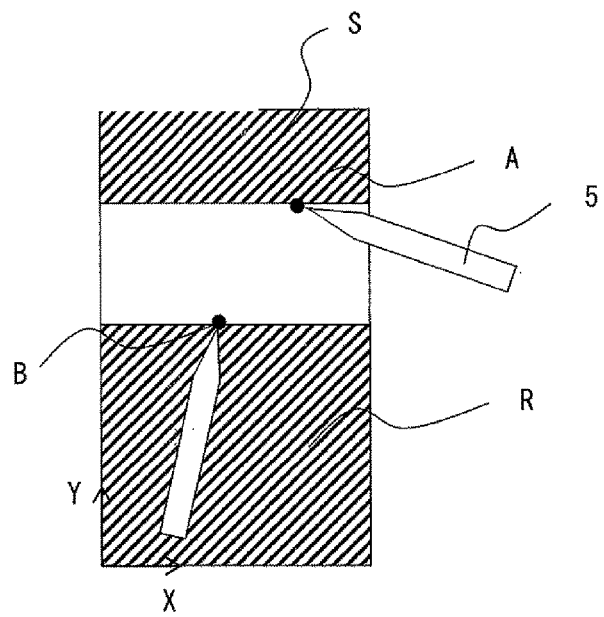
FIG. 10 is a view showing another strip-shaped illumination region when there are two points of contact.

In the example of FIG. 10, a strip-shaped region that lies horizontally in the display unit 1 and has the contact points A and B on its upper and lower horizontal sides (the sides that extend in parallel with the x-axis) is the illumination region R. Specifically, lines that extend in parallel with the x-axis from the coordinate positions of the contact points A and B on the y-axis are the borders between the illumination region R and the no-illumination region S.

Note that the specified value is set appropriately according to the type of information or the like that is displayed on the display unit 1. In other words, the region may be any shape as long as it can be derived from the contact points A and B.

Figure 11:
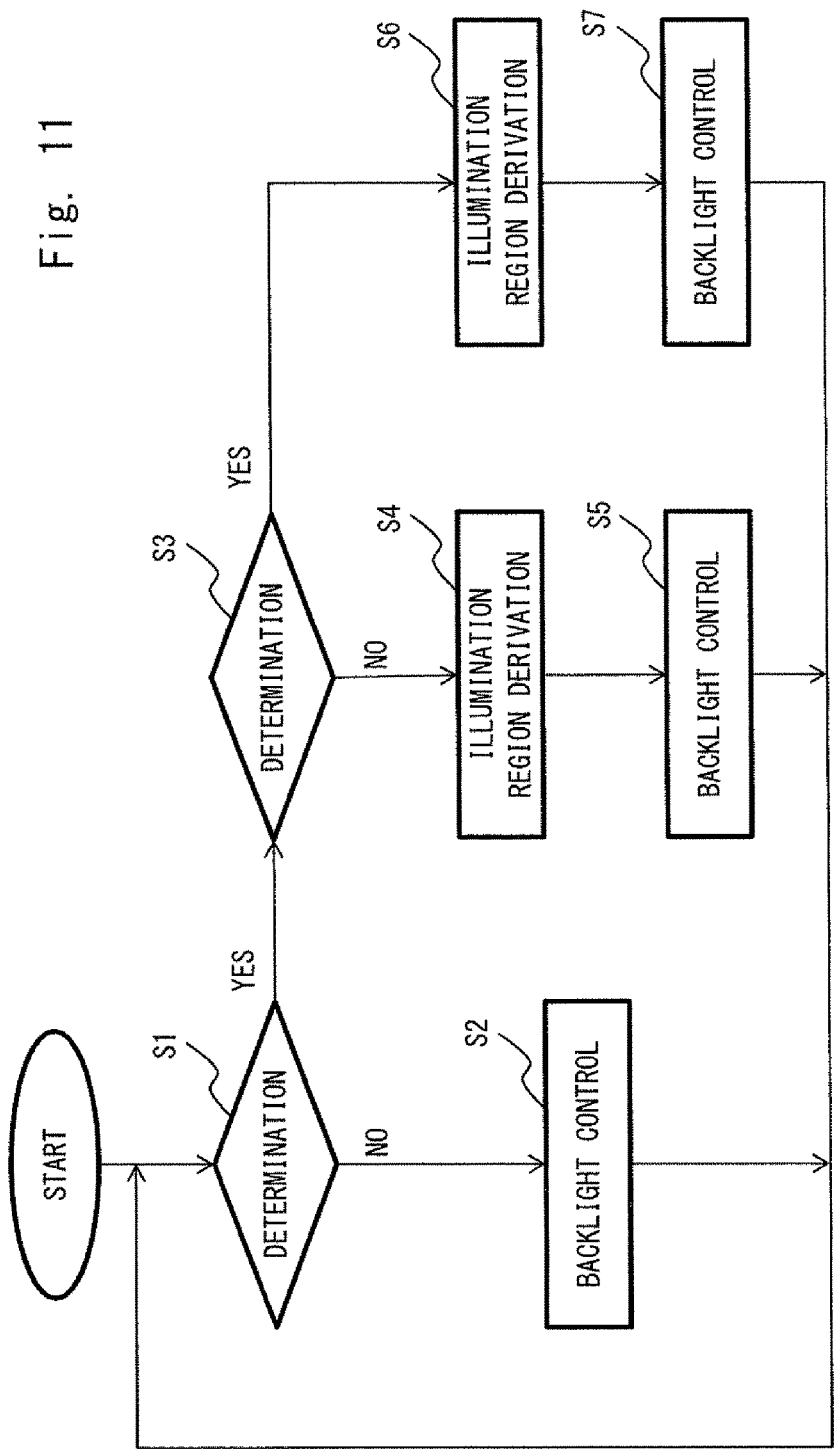
FIG. 11 is an operational flowchart of an illumination region control method of a display device according to the first exemplary embodiment of the invention.

The operation of the display device 100 having the above-described structure is described hereinafter with reference to FIG. 11.

First, the control unit 3 causes the display unit 1 to display a selection key to select the partial illumination mode in advance. When a user selects the selection key through the touch panel 2, the control unit 3 changes the mode from the full illumination mode to the partial illumination mode. This is the start of illumination region control.

Next, the control unit 3 determines whether a user has touched the touch panel 2 or not (S1). To be specific, it is determined whether coordinate information is input from the touch panel 2 until a certain period of time has elapsed from the start of illumination region control. When coordinate information is not input from the touch panel 2 until a certain period of time has elapsed, the control unit 3 controls the backlight 12 to fully turn off the backlight 12 (S2). After that, the control unit 3 returns to Step S1.

On the other hand, when coordinate information is input from the touch panel 2 until a certain period of time has elapsed, the control unit 3 determines whether the next coordinate information is input until a certain period of time has elapsed after the coordinate information is input first (S3). When the next coordinate information is not input until a certain period of time has elapsed, the control unit 3 derives the illumination region so that a region around the coordinate position (contact point A) where the first contact is made is the illumination region as described above (S4) and then controls the backlight 12 to illuminate the illumination region and not to illuminate the other region as the no-illumination region (S5). After that, the control unit 3 returns to Step S1.

On the other hand, when the next coordinate information is input until a certain period of time has elapsed, the control unit 3 derives the illumination region so that a region interposed between the coordinate position (contact point A) where the first contact is made and the coordinate position (contact point B) where the next contact is made is the illumination region R as described above (S6) and then controls the backlight 12 to illuminate the illumination region and not to illuminate the other region as the no-illumination region (S7). After that, the control unit 3 returns to Step S1.

In this manner, it is possible to easily set a desired region as the illumination region R by a simple operation that a user touches desired one point or two points on the touch panel 2. It is thereby possible to reduce power consumption of the display unit 1 and reduce the size of the battery in the electronic apparatus. Further, by the size reduction of the battery, it is possible to achieve size reduction and weight reduction of the electronic apparatus.

A preferred structure of the display device is described hereinafter.

Figure 12:
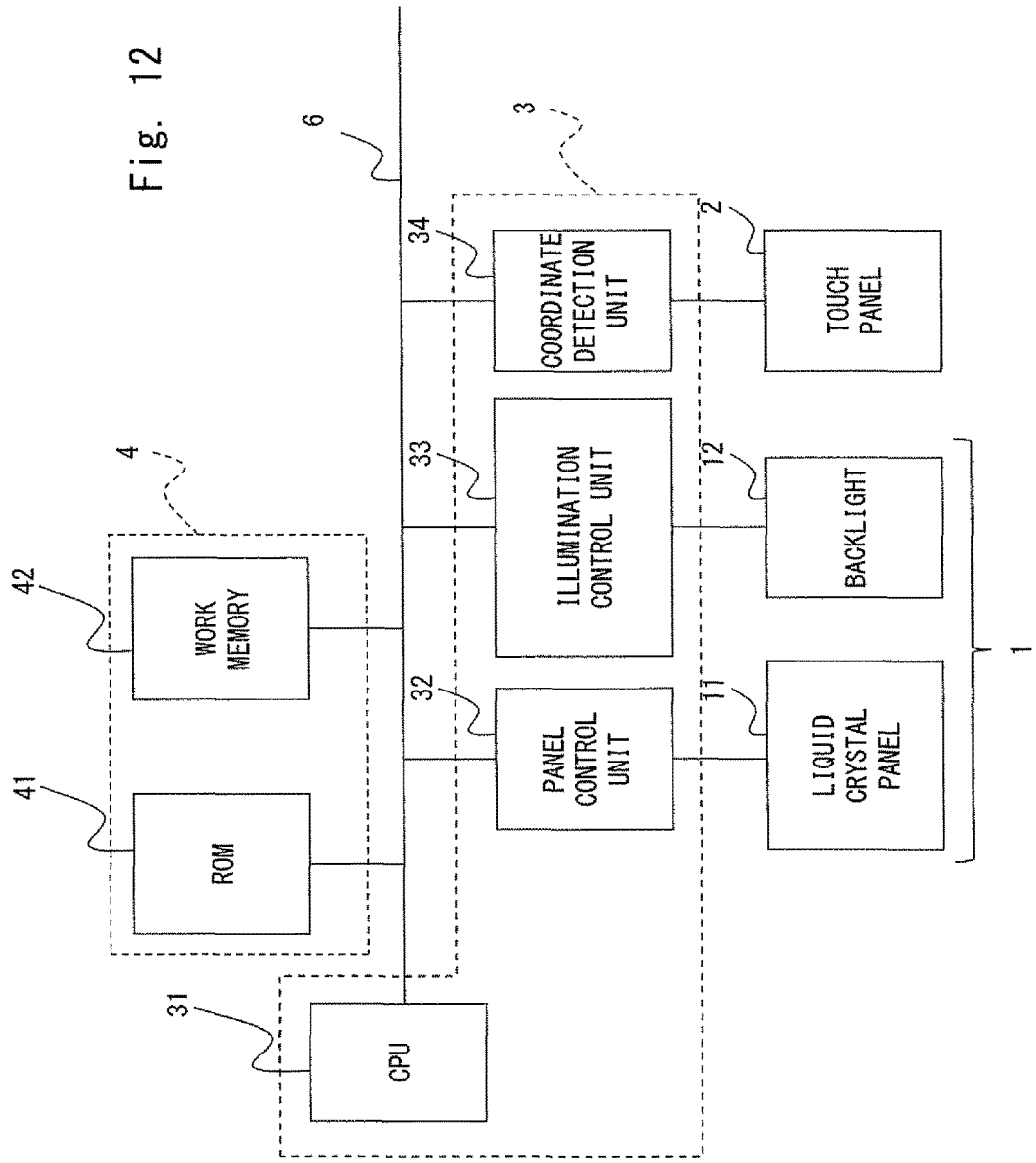
FIG. 12 is a block diagram schematically showing another display device according to the first exemplary embodiment of the invention.

The structure of the display device is the same as described above, and it is preferred that the control unit 3 includes a CPU 31, a panel control unit 32, an illumination control unit 33, and a coordinate detection unit 34, and the storage unit 4 includes a ROM 41 and a work memory 42 as shown in FIG. 12.

The CPU 31 is a processing device that executes a program stored in the ROM 41. To be specific, the CPU 31 starts an application based on processing of the program read from the ROM 41, and outputs an instruction signal to the panel control unit 32 or the illumination control unit 33 to display specified information read from the ROM 41 or the work memory 42 on the display unit 1 or change the display region based on a signal indicating a contact point that is derived by the coordinate detection unit 34 when a user touches the touch panel 2. Further, the CPU 31 outputs an instruction signal to restrict the illumination region by the illumination control unit 33 based on information indicating a contact point that is derived by the coordinate detection unit 34 when a user touches the touch panel 2.

The CPU 31 is connected with each unit through a bus 6.

The panel control unit 32 generates a control signal for the liquid crystal panel 11 to display information stored in the ROM 41 or the work memory 42 on the display unit 1 or change the display region based on the instruction signal input from the CPU 31, and outputs the control signal to the liquid crystal panel 11. The liquid crystal panel 11 is controlled based on the input control signal.

The illumination control unit 33 generates a control signal for the backlight 12 to display information stored in the ROM 41 or the work memory 42 on the display unit 1, change the display region or restrict the illumination region based on the instruction signal input from the CPU 31, and outputs the control signal to the backlight 12. The backlight 12 is controlled based on the input control signal.

The coordinate detection unit 34 derives a signal indicating a contact point based on the signal indicating the coordinate information input from the backlight 12, and outputs the signal indicating the contact point to the CPU 31.

Second Exemplary Embodiment

In the display device, the electronic apparatus and the illumination region control method of a display device according to the first exemplary embodiment, it is assumed that contact with the touch panel 2 is made at one or two points. In a display device, an electronic apparatus and an illumination region control method of a display device according to this exemplary embodiment, it is assumed that contact with the touch panel 2 is made at three points.

Specifically, although the display device, the electronic apparatus and the illumination region control method of a display device according to this exemplary embodiment are substantially the same as the display device, the electronic apparatus and the illumination region control method of a display device according to the first exemplary embodiment, when the coordinate information for the third point is input after the coordinate information for the first and second points are input, the control unit according to this exemplary embodiment controls the liquid crystal panel 11 and the backlight 12 based not only on the coordinate information for the first and second points but also on the coordinate information for the third point.

Figure 13:
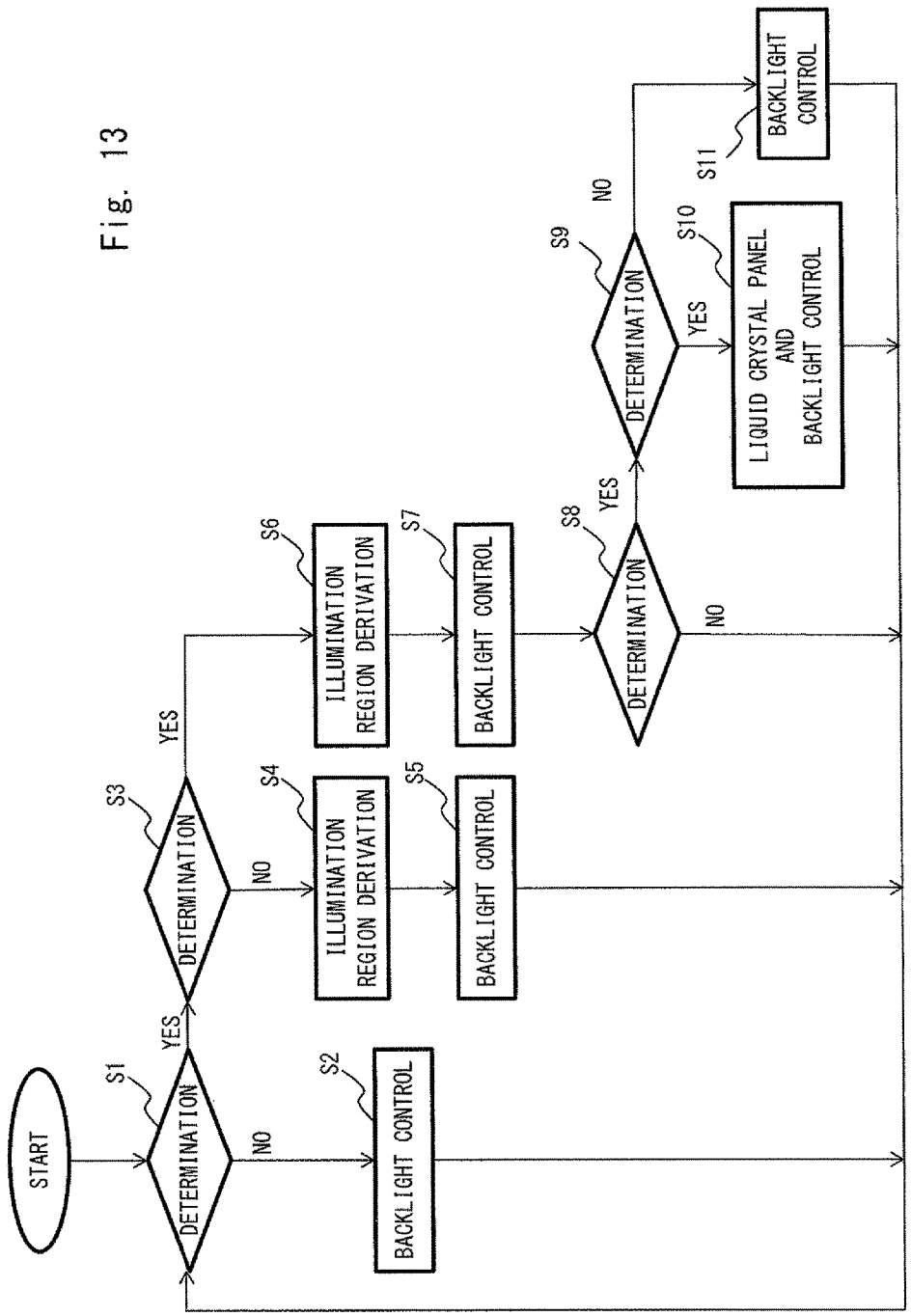
FIG. 13 is an operational flowchart of an illumination region control method of a display device according to a second exemplary embodiment of the invention.

To be specific, the display device operates as shown in FIG. 13. The process until the coordinate information for the second point is input to the control unit and then a desired region is set as the illumination region based on the coordinate information for the first point and the coordinate information for the second point is the same as that of the display device according to the first exemplary embodiment and thus not redundantly described.

After the control unit controls the backlight 12 so that a region interposed between the first coordinate position (contact point A) and the second coordinate position (contact point B) is the illumination region, the control unit determines whether the coordinate information for the third point is input or not until a certain period time has elapsed (S8). When the coordinate information for the third point is not input until a certain period time has elapsed, the control unit sets the region interposed between the first coordinate position and the second coordinate position as the illumination region and then returns to Step S1.

Figure 14:
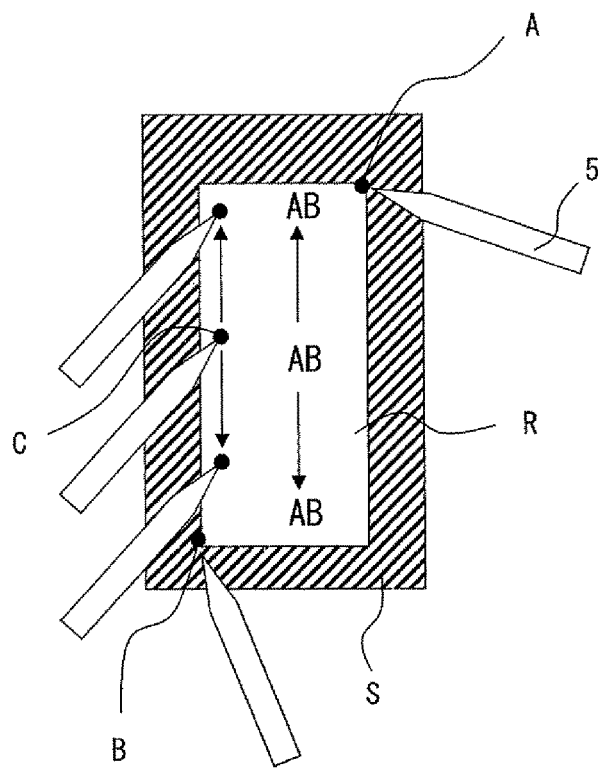
FIG. 14 is a view showing a display operation by a display unit when there are three points of contact.

On the other hand, when the coordinate information for the third point is input until a certain period time has elapsed, the control unit determines whether the third coordinate position (contact point C) is within the illumination region that is interposed between the first coordinate position and the second coordinate position (S9). When the third coordinate position is within the illumination region, the control unit controls the liquid crystal panel 11 and the backlight 12 to move the display information near the third coordinate position within the illumination region based on the contact operation with the touch panel 2 from the third coordinate position as shown in FIG. 14 (S10). Specifically, when a user moves the contact point upward from the third coordinate position, keeping the touch pen 5, for example, in contact with the touch panel 2, the control unit moves the display information upward, and when a user moves the contact point downward from the third coordinate position, keeping the touch pen 5, for example, in contact with the touch panel 2, the control unit moves the display information downward. After that, the control unit returns to Step S1.

Figure 15:
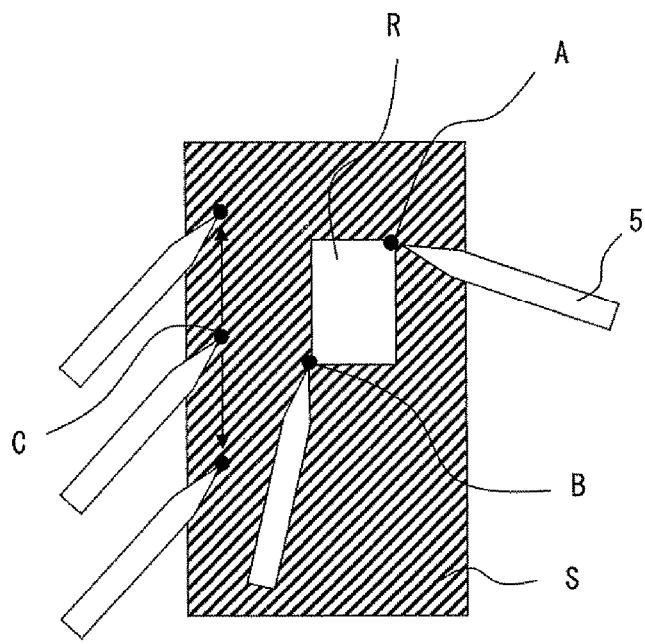
FIG. 15 is a view showing an operation to turn on illumination by a display unit when there are three points of contact.

On the other hand, when the third coordinate position is not within the illumination region, the control unit controls the backlight 12 to change the brightness in the illumination region based on the contact operation with the touch panel 2 from the third coordinate position as shown in FIG. 15 (S11). Specifically, when a user moves the contact point upward from the third coordinate position, keeping the touch pen 5, for example, in contact with the touch panel 2, the control unit increases the brightness in the illumination region, and when a user moves the contact point downward from the third coordinate position, keeping the touch pen 5, for example, in contact with the touch panel 2, the control unit decreases the brightness in the illumination region. After that, the control unit returns to Step S1.

In this manner, it is possible to easily move the display information or change the brightness in the illumination region based on a user's third contact with the touch panel 2.

The present invention is not limited to the above-described exemplary embodiments, and various changes may be made therein without departing from the spirit and scope of the present invention.

Figure 16:
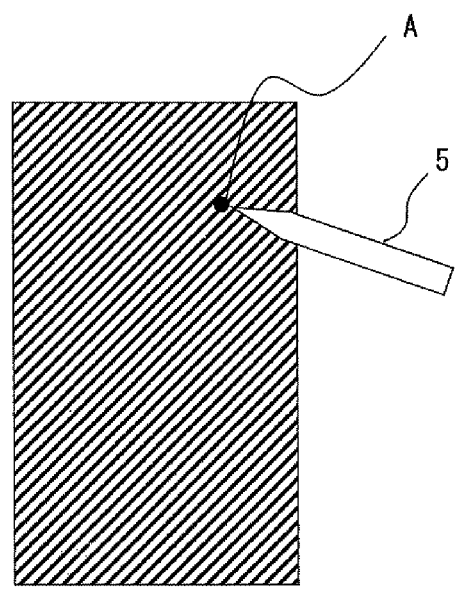
FIG. 16 is a view showing an operation to turn off illumination by a display unit when there is one points of contact.

Although a region around the first contact point with the touch panel 2 is set as the illumination region in the above-described exemplary embodiments, the illumination may be fully turned off by the first contact with the touch panel 2 as shown in FIG. 16.

Although the display device is mounted on the electronic apparatus in the above-described exemplary embodiments, a device on which the display device is mounted is not limited to electronic apparatus.

The whole or part of the exemplary embodiments disclosed above can be described as, but not limited to, the following supplementary notes 1 to 14 as a novel technique.

<Supplementary Note 1>

A display device comprising:
 a display means;
 a touch panel disposed on the display means, for outputting coordinate information of a contact point; and
 a control means for setting a region around a contact point as an illumination region when contact with the touch panel is made at one point, and setting a region interposed between a first contact point and a second contact point as the illumination region when contact with the touch panel is made at two points, based on the coordinate information of the contact point.

<Supplementary Note 2>

The display device according to Supplementary note 1, wherein
 the control means determines whether coordinate information of a second contact point is input within a specified period of time after coordinate information of a first contact point is input, and when the coordinate information of the second contact point is input within the specified period of time, sets a region interposed between the first contact point and the second contact point as the illumination region, and when the coordinate information of the second contact point is not input within the specified period of time, sets a region around the first contact point as the illumination region.

<Supplementary Note 3>

The display device according to Supplementary note 1 or 2, wherein
 the control means determines whether a third contact point is within a region interposed between the first contact point and the second contact point, and
 when the third contact point is within the region, the control means moves display information displayed near the third contact point within the region based on a contact operation from the third contact point, and
 when the third contact point is outside the region, the control means changes brightness in the region based on a contact operation from the third contact point.

<Supplementary Note 4>

The display device according to Supplementary note 3, wherein
 the control means determines whether coordinate information of a third contact point is input within a specified period of time after coordinate information of a second contact point is input, and
 when the coordinate information of the third contact point is input within the specified period of time, the control means determines whether the third contact point is within a region interposed between the first contact point and the second contact point, and
 when the coordinate information of the third contact point is not input within the specified period of time, the control means sets a region interposed between the first contact point and the second contact point as the illumination region.

<Supplementary Note 5>

An electronic apparatus comprising the display device according to any one of Supplementary notes 1 to 4.

<Supplementary Note 6>

An illumination range control method of a display device, comprising:
 determining whether coordinate information of a second contact point is input within a specified period of time after coordinate information of a first contact point is input by contact with a touch panel disposed on a display means;
 when the coordinate information of the second contact point is input within the specified period of time, setting a region interposed between the first contact point and the second contact point as an illumination region, and when the coordinate information of the second contact point is not input within the specified period of time, setting a region around the first contact point as the illumination region.

<Supplementary Note 7>

The illumination range control method of a display device according to Supplementary note 6, comprising:
  determining whether coordinate information of a third contact point is input within a specified period of time after coordinate information of a second contact point is input;
  when the coordinate information of the third contact point is input within the specified period of time, determining whether the third contact point is within a region interposed between the first contact point and the second contact point, and
  when the third contact point is within the region, moving display information displayed near the third contact point within the region based on a contact operation from the third contact point, and when the third contact point is outside the region, changing brightness in the region based on a contact operation from the third contact point; and
  when the coordinate information of the third contact point is not input within the specified period of time, setting a region interposed between the first contact point and the second contact point as the illumination region.

<Supplementary Note 8>

A display device comprising:
  a display unit;
  a touch panel that is disposed on the display unit and outputs coordinate information of a contact point; and
  a control unit that sets a region around a contact point as an illumination region when contact with the touch panel is made at one point, and sets a region interposed between a first contact point and a second contact point as the illumination region when contact with the touch panel is made at two points, based on the coordinate information of the contact point.

<Supplementary Note 9>

The display device according to Supplementary note 8, wherein
  the control unit determines whether coordinate information of a second contact point is input within a specified period of time after coordinate information of a first contact point is input, and when the coordinate information of the second contact point is input within the specified period of time, sets a region interposed between the first contact point and the second contact point as the illumination region, and when the coordinate information of the second contact point is not input within the specified period of time, sets a region around the first contact point as the illumination region.

<Supplementary Note 10>

The display device according to Supplementary note 8 or 9, wherein
  the control unit determines whether a third contact point is within a region interposed between the first contact point and the second contact point, and
  when the third contact point is within the region, the control unit moves display information displayed near the third contact point within the region based on a contact operation from the third contact point, and
  when the third contact point is outside the region, the control unit changes brightness in the region based on a contact operation from the third contact point.

<Supplementary Note 11>

The display device according to Supplementary note 10, wherein
  the control unit determines whether coordinate information of a third contact point is input within a specified period of time after coordinate information of a second contact point is input, and
  when the coordinate information of the third contact point is input within the specified period of time, the control unit determines whether the third contact point is within a region interposed between the first contact point and the second contact point, and
  when the coordinate information of the third contact point is not input within the specified period of time, the control unit sets a region interposed between the first contact point and the second contact point as the illumination region.

<Supplementary Note 12>

An electronic apparatus comprising the display device according to any one of Supplementary notes 8 to 11.

<Supplementary Note 13>

An illumination range control method of a display device, comprising:
  determining whether coordinate information of a second contact point is input within a specified period of time after coordinate information of a first contact point is input by contact with a touch panel disposed on a display unit;
  when the coordinate information of the second contact point is input within the specified period of time, setting a region interposed between the first contact point and the second contact point as an illumination region, and
  when the coordinate information of the second contact point is not input within the specified period of time, setting a region around the first contact point as the illumination region.

<Supplementary Note 14>

The illumination range control method of a display device according to Supplementary note 13, comprising:
  determining whether coordinate information of a third contact point is input within a specified period of time after coordinate information of a second contact point is input;
  when the coordinate information of the third contact point is input within the specified period of time, determining whether the third contact point is within a region interposed between the first contact point and the second contact point, and when the third contact point is within the region, moving display information displayed near the third contact point within the region based on a contact operation from the third contact point, and when the third contact point is outside the region, changing brightness in the region based on a contact operation from the third contact point; and
  when the coordinate information of the third contact point is not input within the specified period of time, setting a region interposed between the first contact point and the second contact point as the illumination region.

This application is based upon and claims the benefit of priority from Japanese patent application No. 2011-044965, filed on Mar. 2, 2011, the disclosure of which is incorporated herein in its entirety by reference.

REFERENCE SIGNS LIST

1 DISPLAY UNIT
11 LIQUID CRYSTAL PANEL
12 BACKLIGHT

2 TOUCH PANEL
3 CONTROL UNIT
32 PANEL CONTROL UNIT
33 ILLUMINATION CONTROL UNIT
34 COORDINATE DETECTION UNIT
4 STORAGE UNIT
41 ROM
42 WORK MEMORY
5 TOUCH PEN
6 BUS
100 DISPLAY DEVICE
A-D CONTACT POINT
R ILLUMINATION REGION
S NO-ILLUMINATION REGION

What is claimed is:
1. A display device comprising:
a display unit displaying text information;
a touch panel that is disposed on the display unit, and outputs coordinate information of a contact point;
a memory storing a software program and a processor configured to execute the software program and thereby implement a control unit that is configured to:
set a region around a contact point based on coordinate information of the contact point, as an illumination region when contact with the touch panel is made at one point;
determine, when contact with the touch panel is made at two points, whether coordinate information of a second contact point where the second contact with the touch panel is made is input within a specified period of time after coordinate information of the first contact point where the first contact with the touch panel is made is input,
set, when the coordinate information of the second contact point is input within the specified period of time, a rectangle-shaped region that has the first contact point and the second contact point at its opposing corners, an oval-shaped region that has the first contact point and the second contact point at both ends of its long axis, a strip-shaped region that lies vertically in the display unit and has the first contact point and the second contact point on its left and right vertical sides, or a strip-shaped region that lies horizontally in the display unit and has the first contact point and the second contact point on its upper and lower horizontal sides as an illumination region based on the coordinate information of the first contact point and the second contact point,
set, when the coordinate information of the second contact point is not input within the specified period of time, the region around the first contact point as the illumination region based on the coordinate information of the first contact point,
determine whether a third contact point is within the illumination region set based on the coordinate information of the first contact point and the coordinate information of the second contact point,
move the text information located in the illumination region set based on the coordinate information of the first contact point and the coordinate information of the second contact point from the third contact point in a contact operation direction based on the coordinate information of the first contact point, the second contact point, and the third contact point when the third contact point is within the illumination region set based on the coordinate information of the first contact point and the coordinate information of the second contact point, and
increase, when the third contact point is moved upward, a brightness within the illumination region set based on the coordinate information of the first contact point and the coordinate information of the second contact point and decrease, when the third contact point is moved downward, brightness within the illumination region set based on the coordinate information of the first contact point and the coordinate information of the second contact point when the third contact point is outside the illumination region set based on the coordinate information of the first contact point and the coordinate information of the second contact point.

2. An electronic apparatus comprising the display device according to claim 1.

3. An illumination range control method of a display device, the method comprising:
setting a region around a contact point based on coordinate information of the contact point, as an illumination region when contact with the touch panel is made at one point;
determining, when contact with the touch panel is made at two contact points, a first contact point and a second contact point, whether coordinate information of a second contact point where the second contact with the touch panel is made is input within a specified period of time after coordinate information of the first contact point where the first contact with the touch panel is made is input,
setting, when the coordinate information of the second contact point is input within the specified period of time, a rectangle-shaped region that has the first contact point and the second contact point at its opposing corners, an oval-shaped region that has the first contact point and the second contact point at both ends of its long axis, a strip-shaped region that lies vertically in the display unit and has the first contact point and the second contact point on its left and right vertical sides, or a strip-shaped region that lies horizontally in the display unit and has the first contact point and the second contact point on its upper and lower horizontal sides as the illumination region based on the coordinate information of the first contact point and the second contact point,
setting, when the coordinate information of the second contact point is not input within the specified period of time, the region around the first contact point as the illumination region based on the coordinate information of the first contact point,
determining, when contact with the touch panel is made at three points, a first contact point, a second contact point and a third contact point, whether the third contact point is within the illumination region set based on the coordinate information of the first contact point and the coordinate information of the second contact point, based on the coordinate information of the first contact point, the second contact point, and the third contact point,
moving text information located in the illumination region set based on the coordinate information of the first contact point and the coordinate information of the second contact point from the third contact point in a contact operation direction when the third contact point is within the illumination region set based on the coordinate information of the first contact point and the coordinate information of the second contact point, and increasing, when the third contact point is moved upward, a brightness within the illumination region set based on the coordinate information of the first contact point and the coordinate information of the second contact point and decreasing, when the third contact point is moved downward, brightness within the illumination region set based on the coordinate information of the first contact point and the coordinate information of the second contact point when the third contact point is outside the illumination region set based on the coordinate information of the first contact point and the coordinate information of the second contact point.

* * * * *